United States Patent
Koele et al.

(10) Patent No.: US 8,602,261 B2
(45) Date of Patent: Dec. 10, 2013

(54) INSECT CONTROLLING BANDS

(75) Inventors: Tara L. Koele, Union Grove, WI (US); Kwamena Gyakye deGraft-Johnson, Racine, WI (US); Brian T. Davis, Burlington, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 640 days.

(21) Appl. No.: 12/428,542

(22) Filed: Apr. 23, 2009

(65) Prior Publication Data

US 2010/0272767 A1    Oct. 28, 2010

(51) Int. Cl.
*B67D 7/80* (2010.01)
*B67D 7/84* (2010.01)
*A01M 1/20* (2006.01)

(52) U.S. Cl.
CPC .................................. *A01M 1/2061* (2013.01)
USPC ........................................ 222/146.2; 222/175

(58) Field of Classification Search
None
See application file for complete search history.

(56) References Cited

U.S. PATENT DOCUMENTS

| | | | |
|---|---|---|---|
| 1,780,407 A | 11/1930 | Smith | |
| 4,224,901 A | 9/1980 | Carey, Jr. | |
| 4,881,671 A | 11/1989 | Horton | |
| 5,928,275 A | 7/1999 | Yates et al. | |
| 6,070,576 A | 6/2000 | Banucci | |
| 6,342,692 B1 | 1/2002 | Hart et al. | |
| 7,168,630 B1* | 1/2007 | Ketcha et al. | 239/13 |
| 7,300,409 B2 | 11/2007 | Kopanic et al. | |
| 2006/0258962 A1 | 11/2006 | Kopanic et al. | |
| 2006/0260183 A1 | 11/2006 | Hockaday | |
| 2007/0183940 A1* | 8/2007 | Yamamoto et al. | 422/124 |
| 2009/0004067 A1 | 1/2009 | Furner | |
| 2009/0008411 A1* | 1/2009 | Schumacher et al. | 222/175 |

FOREIGN PATENT DOCUMENTS

| | | |
|---|---|---|
| AU | 739016 B2 | 10/2001 |
| DE | 3703986 C1 | 1/1988 |
| GB | 2380940 A | 4/2003 |
| JP | 61161201 A | 7/1986 |
| WO | 03103387 A2 | 12/2003 |
| WO | 2004107818 A1 | 12/2004 |
| WO | WO 2009/003900 | 1/2009 |

OTHER PUBLICATIONS

PCT/US2010/001206 International Search Report dated Oct. 6, 2010.
An undated advertisement, admitted prior art, describing a Manouka insect repellent bracelet, 2009.

* cited by examiner

*Primary Examiner* — Brian Gulledge

(57) ABSTRACT

Disclosed herein are insect repellant wrist and ankle bands. The bands contain a space within which a substrate that has been impregnated with an insect control repellant can be heated by a heater such as a pouch providing an exothermic chemical reaction. Thus, the bands can efficiently act as repellant dispensers without the need for the user to apply the repellant directly to the user's skin or clothing.

13 Claims, 16 Drawing Sheets

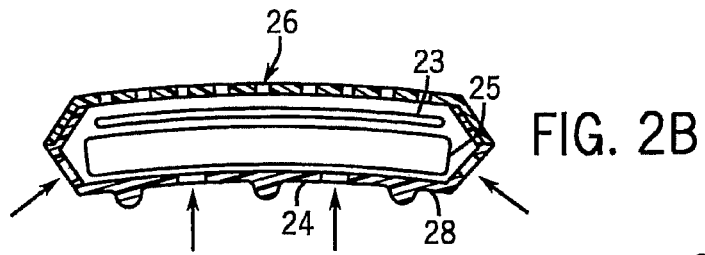
FIG. 2B
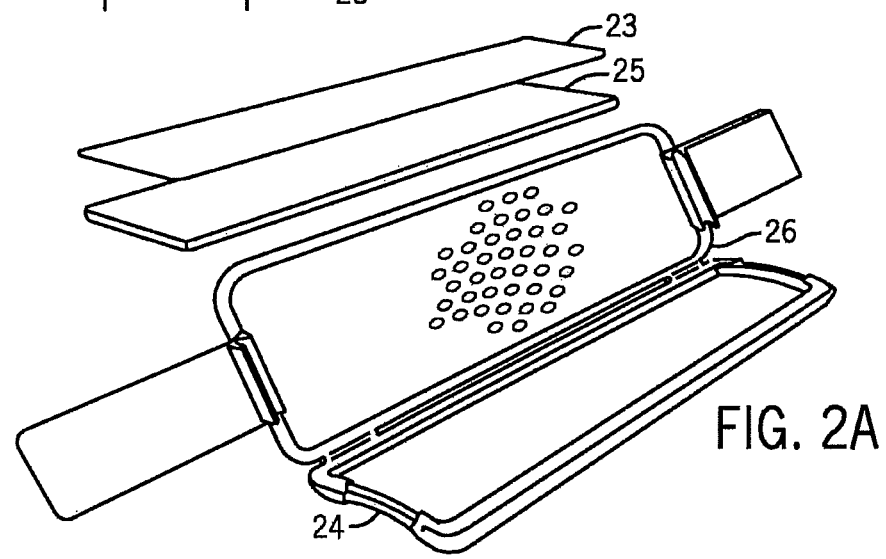
FIG. 2A
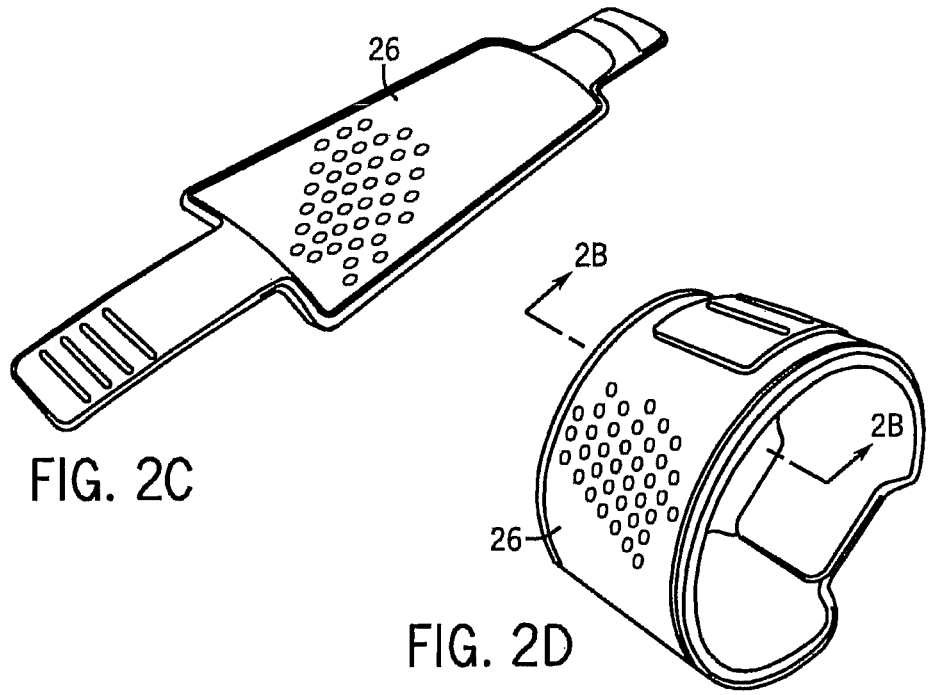
FIG. 2C
FIG. 2D

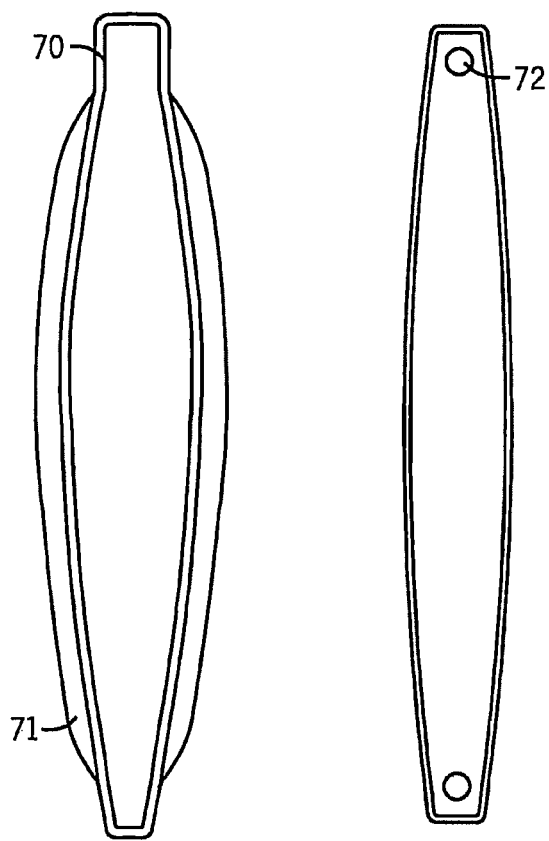
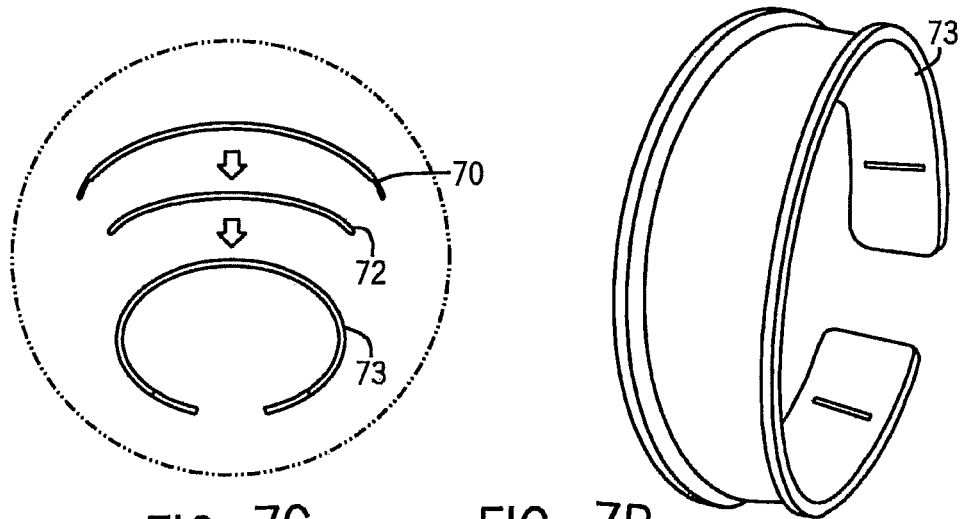
FIG. 7A
FIG. 7C   FIG. 7B

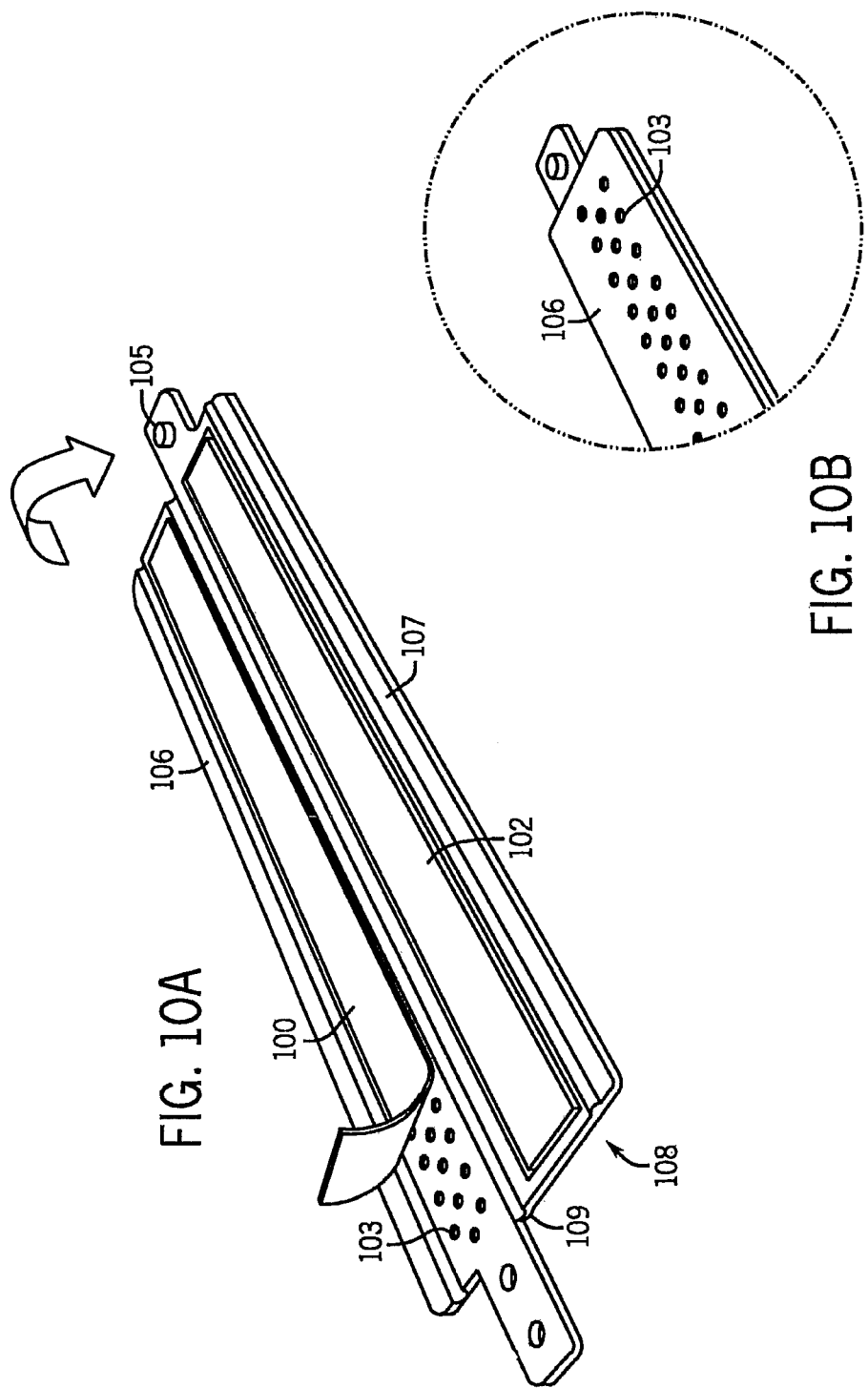

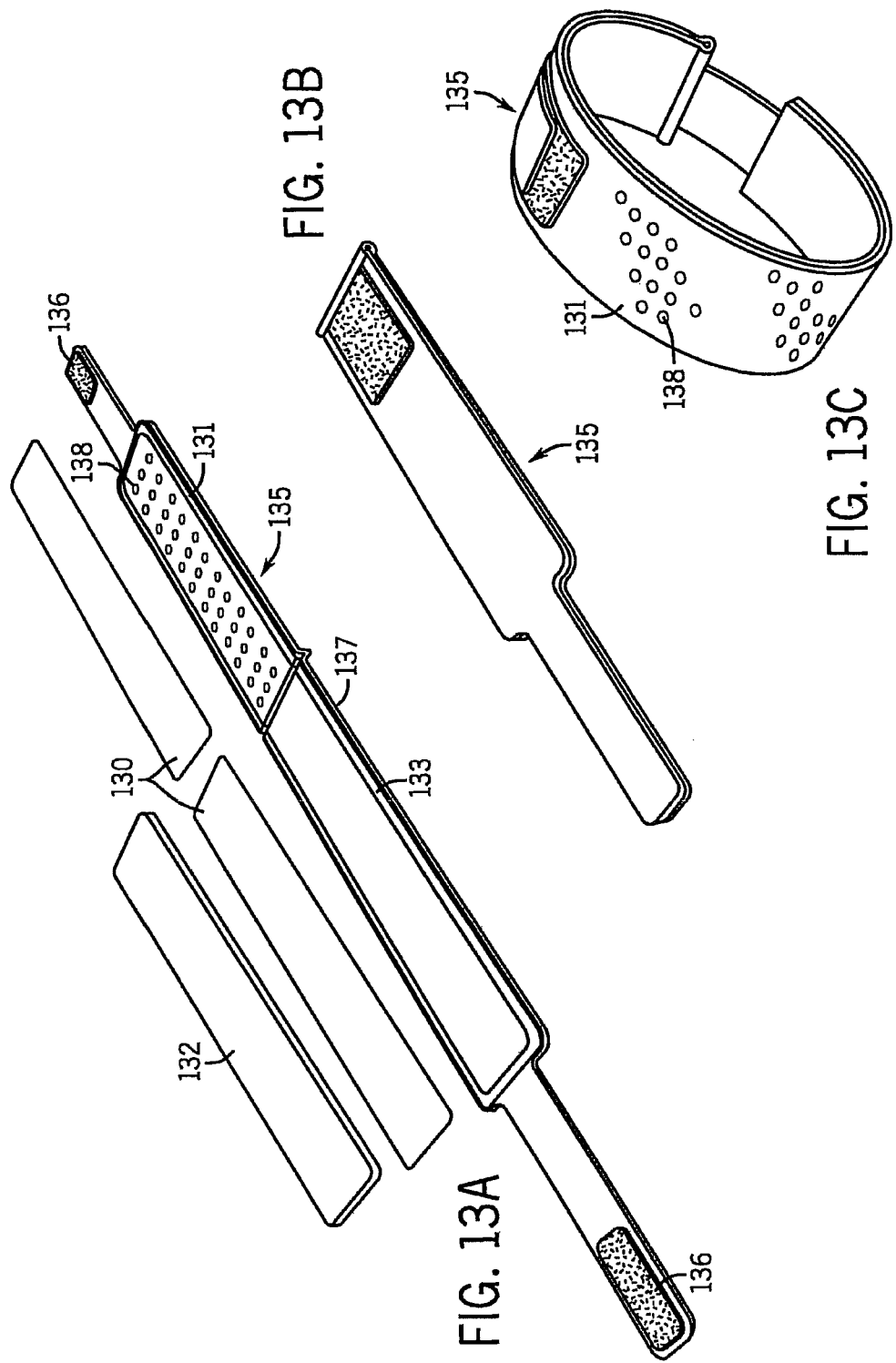

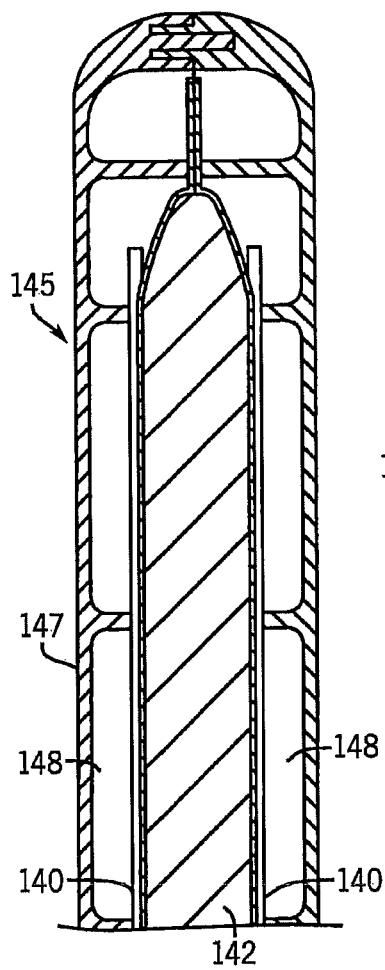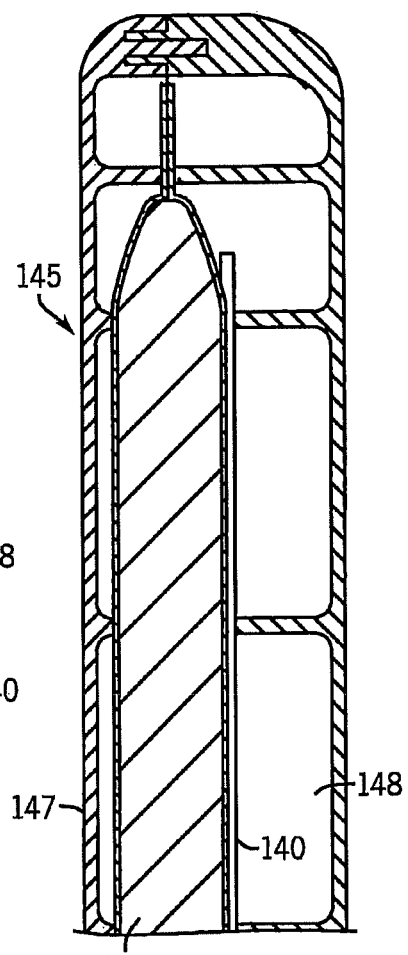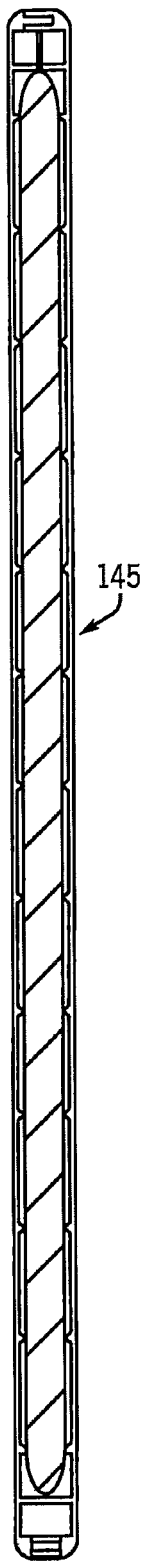
FIG. 14
FIG. 15
FIG. 16

INSECT CONTROLLING BANDS

CROSS-REFERENCE TO RELATED APPLICATIONS

Not applicable.

STATEMENT REGARDING FEDERALLY SPONSORED RESEARCH/DEVELOPMENT

Not applicable

BACKGROUND OF THE INVENTION

The present invention relates to insect controlling bands. More specifically, it provides insect repellant dispensing wrist and ankle bands.

A variety of insects such as mosquitoes and house flies bite and otherwise annoy humans and other animals. Various means have been developed to inhibit this. One approach is to place a volatile insect control chemical directly on human skin, and/or on clothing being worn by a human. However, some consumers are reluctant to place chemicals directly on their skin or clothing.

Hence, there have been attempts to dispense volatile air treatment chemicals without the need for direct contact with human skin or clothing. One approach is to use an active dispensing device positioned somewhere in a room where humans are likely to be. This can range from burnable candles or coils, to electrical dispensing systems. However, this requires treatment of an entire room, and further does not protect a human when they leave the treated room.

Yet another approach is to provide a portable device which a human can clip on their belt. It contains a fan and an insect repellant impregnated substrate. The fan operates when protection is desired. Some consumers may prefer a lower cost, lighter weight, alternative.

It has also been suggested to coat a wrist bracelet or other belt-like object with a volatile mosquito repellant or other insect control ingredient, so as to create as a passive dispenser of mosquito repellant. While this approach allows some protection to travel with the human, and is relatively low cost, even using highly volatile and strong repellants such passive evaporation provides only limited protection. See also WO 2009/003900.

In unrelated work, U.S. Pat. No. 7,300,409 discloses a patch for delivering a therapy chemical to the skin using vibration. The device can optionally also be provided with a pouch that chemically produces heat, or be provided with various fragrancing chemicals such as lavender oil which can be volatized from the device. This device can be bulky and relatively costly if constructed to perform all of these functions at the same time.

Hence, a need still exists for improved ways of dispensing insect control actives, particularly where the protection is for a moving human.

BRIEF SUMMARY OF THE INVENTION

The present invention provides insect controlling bands designed to be worn by the user, for example around a wrist or ankle. In one preferred aspect there is provided a band structure, a substrate that has a volatile insect control chemical mountable on the band structure, and a heater positioned to be suitable to, when initiated, heat the substrate to expedite dispensing of the volatile insect control chemical.

In various preferred forms:

(a) the heater is in the form of a holder that retains a heating structure.

(b) the holder is in the form of a pouch, and the heating structure comprises chemicals positioned in the pouch that if initiated will chemically generate heat. For example the chemicals (e.g. iron oxide) can be caused to generate heat by exposure to air;

(c) the substrate is part of the pouch itself;

(d) the band structure is essentially arc-shaped and extends over an arc of between 270 and 360 degrees;

(e) the band structure has an upper cover and a lower support such that when the upper cover lies on top of the lower support they form a housing with a cavity there between. For example, the substrate and heater can be positioned in the cavity between the upper cover and lower support, and the cavity can be opened when it is desired to remove the substrate and/or heater, and/or replace one or both. Also, there may be ribs or other structures on or under the lower support that help insulate the wrist or ankle where the device is worn from being exposed to heat generated by the device;

(f) the substrate and/or the heater are provided with a peel-off cover that can be removed prior to use;

(g) the volatile insect control chemical is a repellant (e.g. a mosquito repellant) selected from the group consisting of transfluthrin and metafluthrin;

(h) the band structure is configured such that in use the volatile insect control chemical is dispensed both radially up out and also sideways;

(i) there are two such substrates that sandwich the heater; and (j) the device is configured to help insulate the wrist or ankle where the device is worn from being exposed to heat generated by the device.

In another aspect the invention provides an insect controlling device wearable on a human wrist or human ankle. It has a band structure, a substrate that has a volatile insect control chemical mountable on the band structure, and a heater positioned to be suitable to, when initiated, heat the substrate to expedite dispensing of the volatile insect control chemical. In this form of the invention the heater is of a type that can be initiated by exposing chemicals in the heater to air, so as to thereby cause an exothermic reaction.

Note that when a heater of the present invention is initiated the heat will expedite dispensing of the volatile insect control chemical. While the band is preferably arc-shaped and extends between 270 and 360 degrees, it may have other shape and extents.

More than one heater and/or more than one substrate may be present in the cavity. For example, a single heater may be sandwiched between two substrates, with active diffusing both up and down.

A wide variety of insect control ingredients (especially insect repellants) may be used. Preferred repellents include highly volatile synthetic pyrethroid esters, such a transfluthrin or metafluthrin. Other insect control ingredients include volatile insecticides, volatile insect-repelling natural oils, volatile insect growth regulators, and mixtures thereof.

The materials that the upper cover or lower support are made of are not critical, albeit it is preferred that they be a heat resistant plastic (e.g. polypropylene or polyethylene). Also, there can be a rigid part of the band that houses the substrate and heater, and then also flexible attachment strap portions of the band.

The substrate may be formed from a variety of known substrate materials for dispensing insect control ingredients (e.g. PET, Barex® plastic film, cellulosic materials, cloth, etc.).

In a particularly preferred form the heater includes chemicals within a pouch that react to give off heat when initiated by exposure to air or otherwise. These may include a variety of exothermic chemical reaction based heating chemicals. Most preferred chemicals are those that evolve heat when contacted with oxygen, particularly those which use iron/iron oxide based powders. For example, a preferred type of pouch uses iron powder, a small amount of water, vermiculite, active carbon, and sodium chloride inside a pouch. When ambient air reaches the iron (e.g. a cover is pulled off a permeable surface of the pouch), the iron oxidizes, giving off heat. See e.g. U.S. patent application publication 2006/0258962.

The substrate impregnated with the insect control chemical may be part of the pouch itself. In other embodiments, the substrate is a separate material placed adjacent to the heat pouch.

Accordingly, this invention provides a lightweight and inexpensive way to expedite dispensing of active from the band. The outer portions of the band can be reusable as the band can be opened to install a fresh heating pouch and substrate. Alternatively, they can be disposable after a single use as well. In any event, it is particularly desirable that structures be provided to insure active is dispensed along the skin and to insure that the skin is not exposed to uncomfortable levels of heat.

As such, protection can be achieved without directly coating active on human skin and/or sensitive clothing.

The foregoing and other advantages of the present invention will be apparent from the following description. In that description reference is made to the accompanying drawings which form a part thereof, and which there is shown by way of illustration, and not limitation, preferred embodiments of the invention. Such embodiments do not represent the full scope of the invention.

BRIEF DESCRIPTION OF THE DRAWINGS

FIG. 2A is perspective exploded view of an opened second embodiment;

FIG. 2B is a cross sectional view taken generally along line 2B-2B, but with further schematic indications;

FIG. 2C is a perspective view of the FIG. 2A structure, but assembled and closed;

FIG. 2D is a perspective view of the FIG. 2C structure, but wrapped as it would appear on a wrist or ankle;

FIG. 7A is a view similar to FIG. 1A, but of a seventh embodiment;

FIG. 7B is a perspective view of a molded base used for mounting the FIG. 7A components;

FIG. 7C schematically depicts how the seventh embodiment components can be assembled;

FIG. 10A is a view similar to FIG. 3B, but of a tenth embodiment;

FIG. 10B is a view similar to FIG. 3C, but of the tenth embodiment;

FIG. 13A is a view similar to FIG. 2A, but of a thirteenth embodiment;

FIG. 13B is a view similar to FIG. 2C, but of the thirteenth embodiment;

FIG. 13C is a view similar to FIG. 2D but of the thirteenth embodiment;

FIG. 14 is a partial cross sectional view of a fourteenth embodiment;

FIG. 15 is a view similar to FIG. 14, but of a fifteenth embodiment;

FIG. 16 is a more complete cross sectional view of a sixteenth embodiment;

DETAILED DESCRIPTION OF THE INVENTION

Figure 1A:
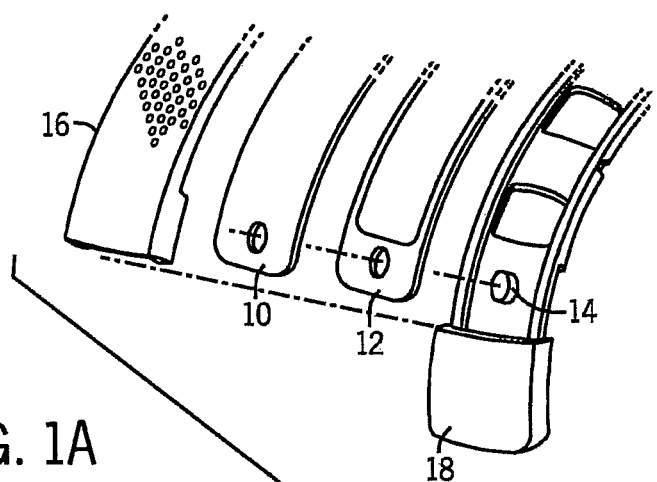
FIG. 1A is a top view of a preferred substrate and a preferred heating pouch of a first embodiment, positioned side-by-side.

Referring first to FIG. 1A, an insect repellant such as transfluthrin is applied to a polyethylene film to coat and/or impregnate it so as to constitute substrate 10. The ends of the substrate are formed with holes 11 which will assist in aligning and mounting the substrate. The active can be applied by various techniques such as roller application, printing, point dosing, etc.

FIG. 1A also shows a heating pouch 12. As shown in FIG. 1D it can contain a mix of chemicals 13 (e.g. particularly iron powder) that when exposed to air will generate heat. Again, there are alignment holes 15 at the ends of the pouch.

Figure 1B:
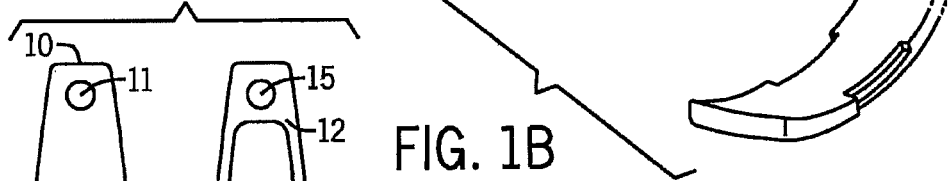
FIG. 1B is a partial exploded perspective view of the band of the first embodiment.
Figure 1C:
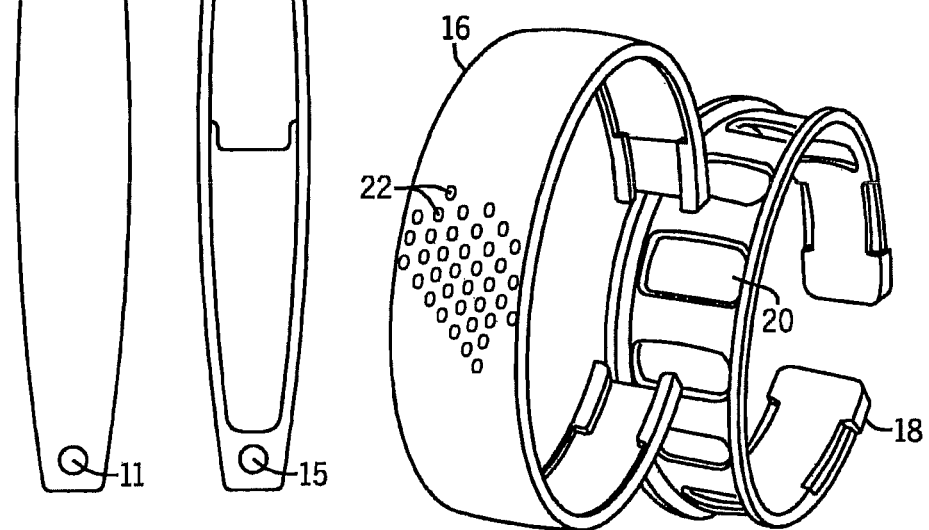
FIG. 1C is a view similar to FIG. 1B, but only of the upper cover and lower support, and in any event showing more of the structure.
Figure 1D:
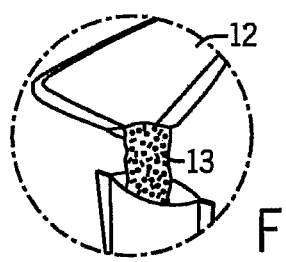
FIG. 1D is a partial perspective view showing contents of portions of the pouch of FIG. 1A.

There is also a main band structure as shown in FIGS. 1B and 1C where there is an upper cover 16 and a lower support 18. These are flexible plastic arcs of significantly over 270 degrees. The lower support 18 has vent openings 20.

The upper cover 16 and the lower support 18 together, when assembled, create an internal cavity space in which can be positioned both the substrate 10 and heating pouch 12. See e.g. FIG. 1B. In this regard, pegs 14 project into holes 11 and 15 to align these parts. Note also perforations 22 through upper cover 16 which will allow active dispensing from substrate 10 to pass out from the band.

It should be appreciated from the FIG. 1B drawing that the parts here snap together. However, when the substrate and/or heater is used up, the parts may be returned to the FIG. 1B positioning, followed by replacement of the substrate and heater. Thus, the upper cover and lower support can be used multiple times.

In a second preferred embodiment represented by FIGS. 2A-2D, the insect repellant is applied to a film to make the substrate 23. A separate heating pouch 25 is also provided. However, in this embodiment, the upper cover 26 is hinged to the lower support 24. Also, here both are perforated to allow air flow.

The band is assembled by placing the heating pouch 25 inside the opened band along the lower support 24, placing the substrate 23 on the heating pouch 25, and pivoting the upper cover 26 until it snaps together with the lower support 24. A refinement is that the lower support here includes ribs 28 which both help keep the heat away from the human wrist and allow some air flow from inwardly of the band up to the heater.

The remaining embodiments use generally similar principles, but each has its own specific features. For example, the embodiment of FIGS. 3A-3B has a band 31 with a heating pouch 33 and a substrate 30. There is also an adhesive layer 37 overlain by a peel-off paper seal 36, and a separate paper seal 35 over the heating pouch.

Figure 3A:
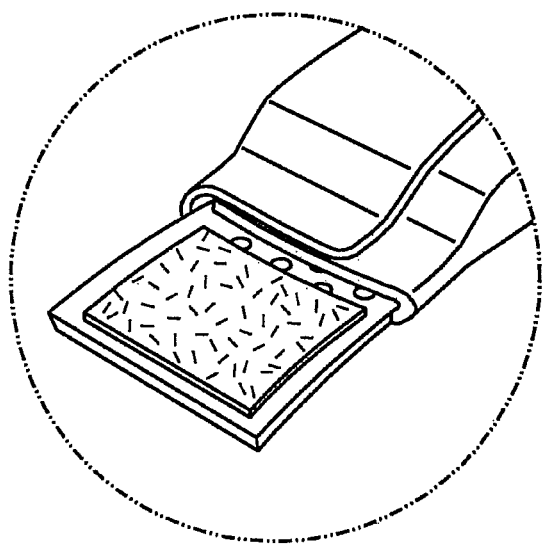
FIG. 3A is a perspective view of an end of a band of a third embodiment of the present invention.
Figure 3B:
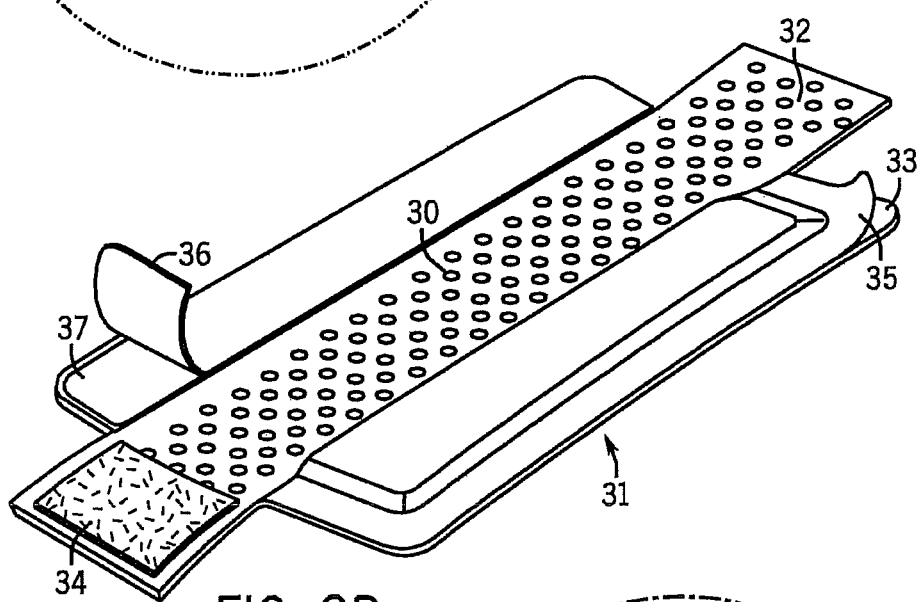
FIG. 3B is a full perspective view of the third embodiment, but shown opened.

To prepare this embodiment for use, the substrate 30 impregnated with repellant, and is placed centrally along the band. The paper seal 35 is then removed to expose the heating pouch 33 to air. Next, the paper seal 36 is completely removed to expose all of the adhesive layer 37, and the flaps are folded as shown in FIG. 3A. Strap parts 32/34 form a Velcro® type system to wrap the band around a wrist.

Figure 3C:
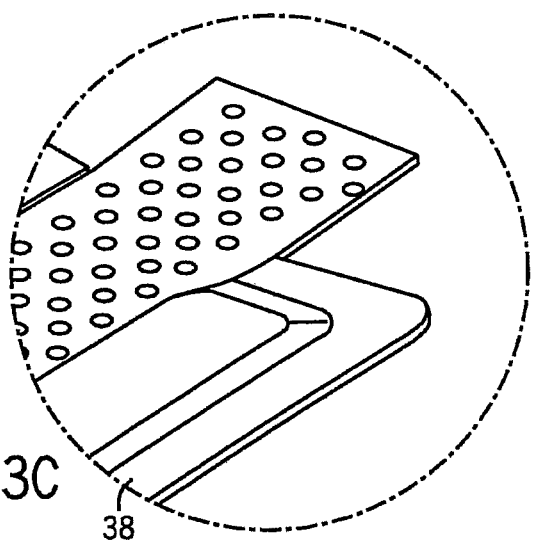
FIG. 3C shows that the FIG. 3A embodiment could instead be implemented with only one fold over flap.

As an alternative, there could be an adhesive portion under paper seal 35 and only one fold over flap used per FIG. 3C.

Figure 4A:
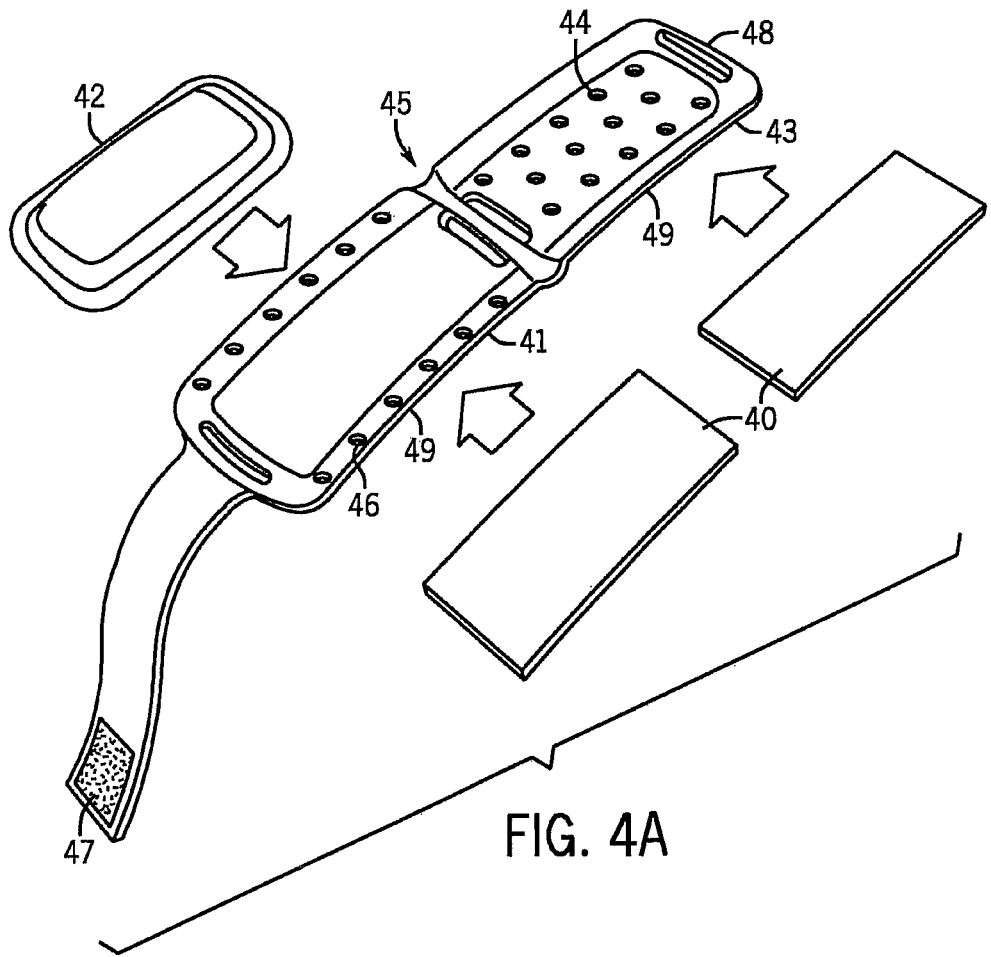
FIG. 4A is perspective view of an open band of a fourth embodiment, in exploded form.
Figure 4B:
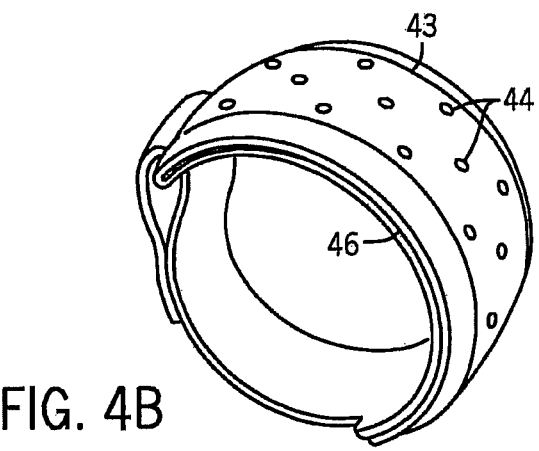
FIG. 4B is a perspective view of that fourth embodiment as it would be installed.

The embodiment of FIGS. 4A-B has a upper cover 43 and lower support 41 that are hingedly connected together and closable via a snap closure tab 48. When closed, the band contains top perforations 44 and also downward perforations 46 for venting. The upper cover 43 and lower support 41 together define a cavity 49.

To prepare for use, two substrates 40 impregnated with repellant are placed in depressions in each side of the clamshell, and the heating pouch 42 is sandwiched there between when the structure is closed. Again, there is a strap form Velcro® type closure 47.

Figure 5A:
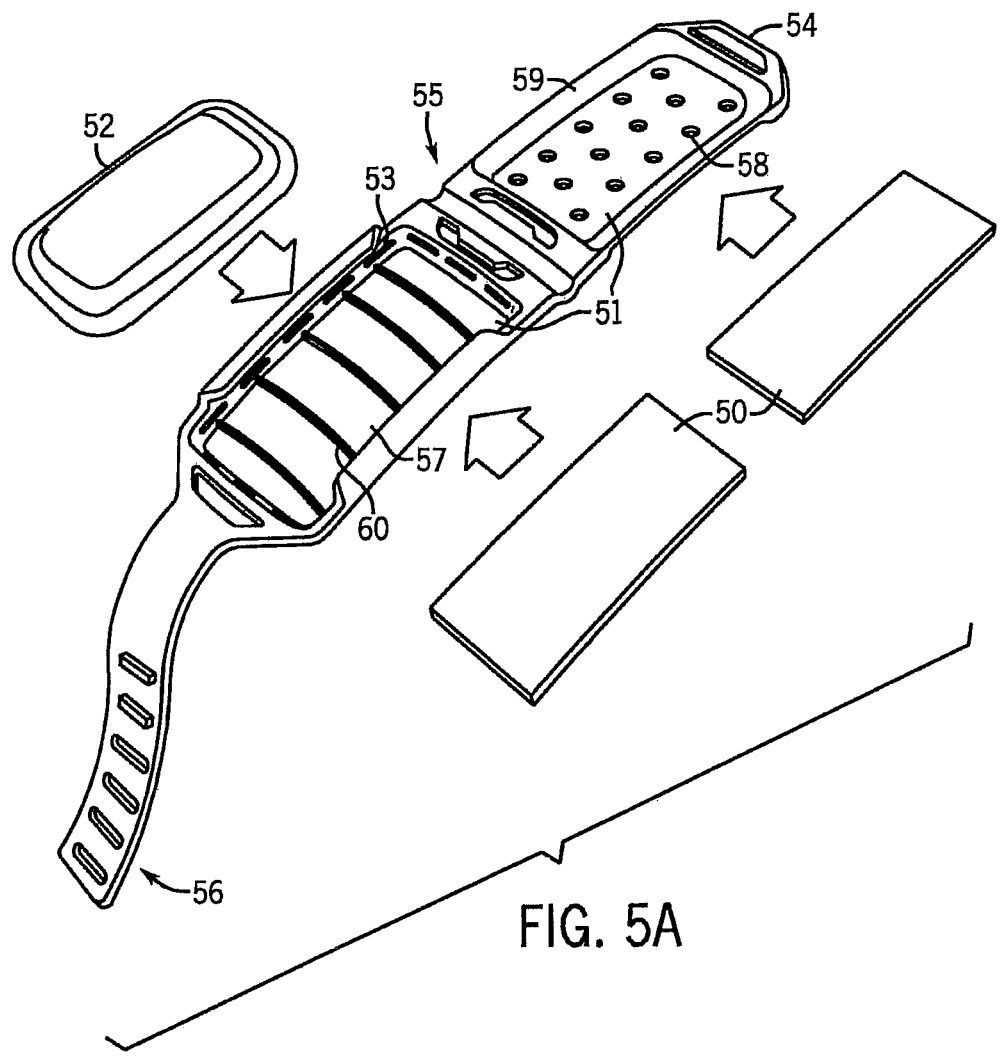
FIG. 5A is view similar to FIG. 4A, but of a fifth embodiment.
Figure 5B:
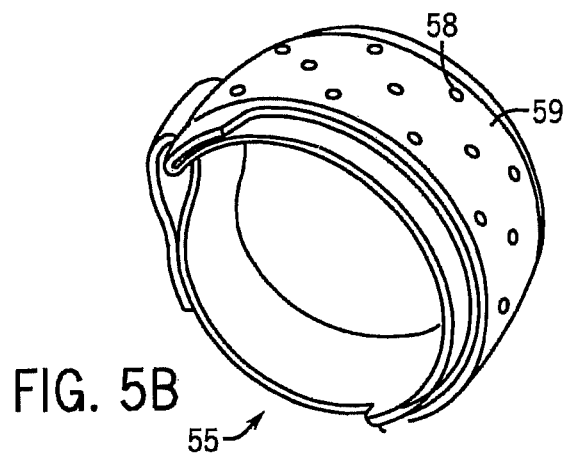
FIG. 5B is a view similar to FIG. 4B, but of the fifth embodiment.

In the embodiment of FIGS. 5A-5B the band 55 has an upper cover 59 with a lower support 57 hingeably connected and closable via a snap closure tab 54. Note also perforations 53 and 58. There are also depressions 51 for receiving the substrates 50.

There are also raised ribs 60 which help keep the substrate nearest the skin from transmitting uncomfortable levels of heat to the human skin. In any event, again a heating pouch 52 is sandwiched between the substrates. However, here the strap 56 loops back on itself.

Figure 6A:
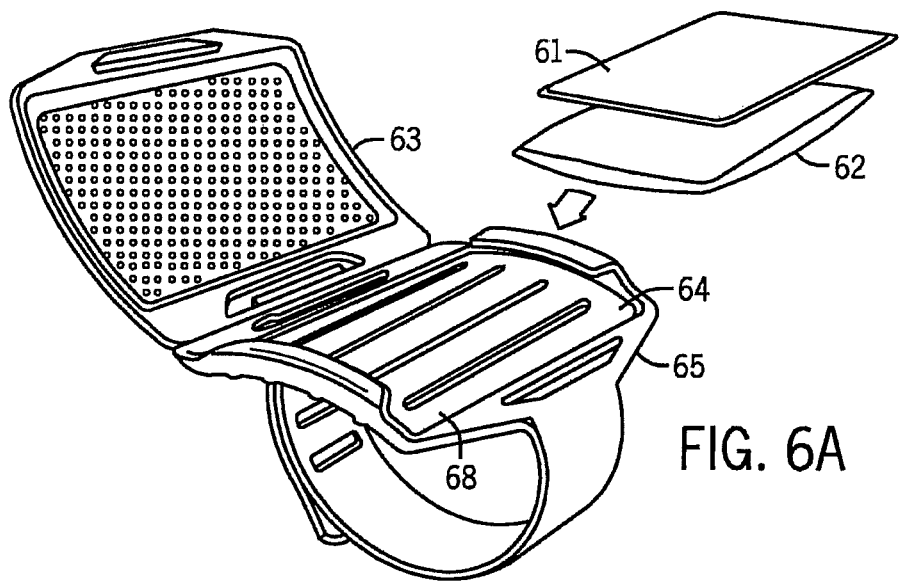
FIG. 6A is a view similar to FIG. 5A, but of a sixth embodiment.
Figure 6B:
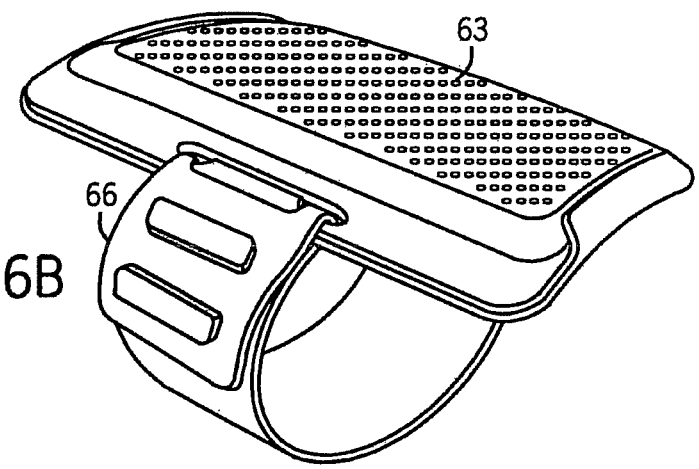
FIG. 6B is a side view of the FIG. 6A band.
Figure 6C:
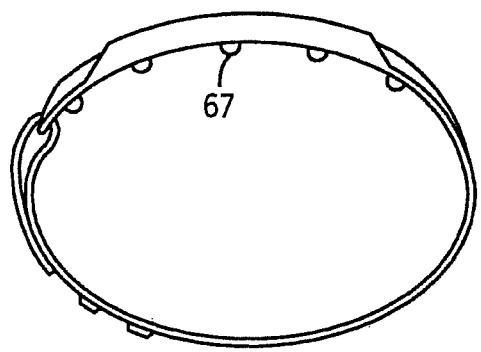
FIG. 6C is a view similar to FIG. 5B, but of the sixth embodiment.

In the FIGS. 6A-C embodiment a band 65 has a perforated snap-fit casing 63/64 with slotted vents 68. Ribs 67 underneath the lower support 64 serve to keep heat away from the wrist and aid airflow. To prepare for use, a heating pouch 62 is placed into the casing 63/64 and a substrate 61 impregnated with repellant is placed above the heat pad and the casing is snapped shut as shown in FIG. 6C. In this embodiment, the band is strapped onto a wrist or ankle via an interlocking self-fastening closure 66.

In the embodiment of FIGS. 7A-C the band 73 only has a lower support, with no upper cover. Again, there is a heating pouch 72 and an impregnated substrate 70. As the band 73 itself is a flexible plastic structure, no separate strap is needed. The adhesive on the back of the heating pouch acts to hold it on the band 73, and the adhesive on the wings of the substrate extension 71 keep it in place.

Figure 8A:
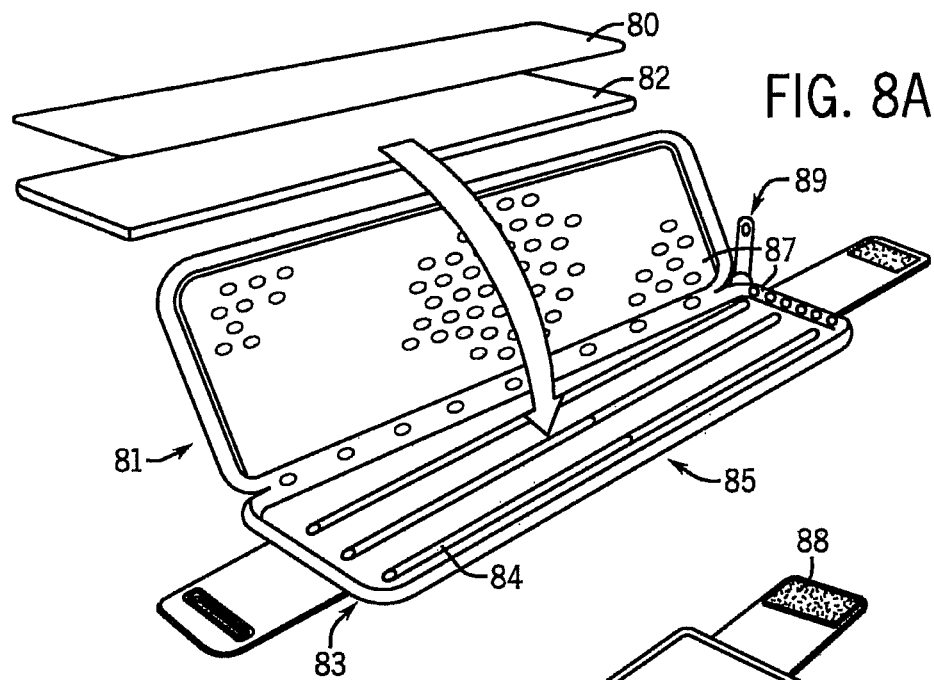
FIG. 8A is a view similar to FIG. 2A, but of an eighth embodiment.
Figure 8B:
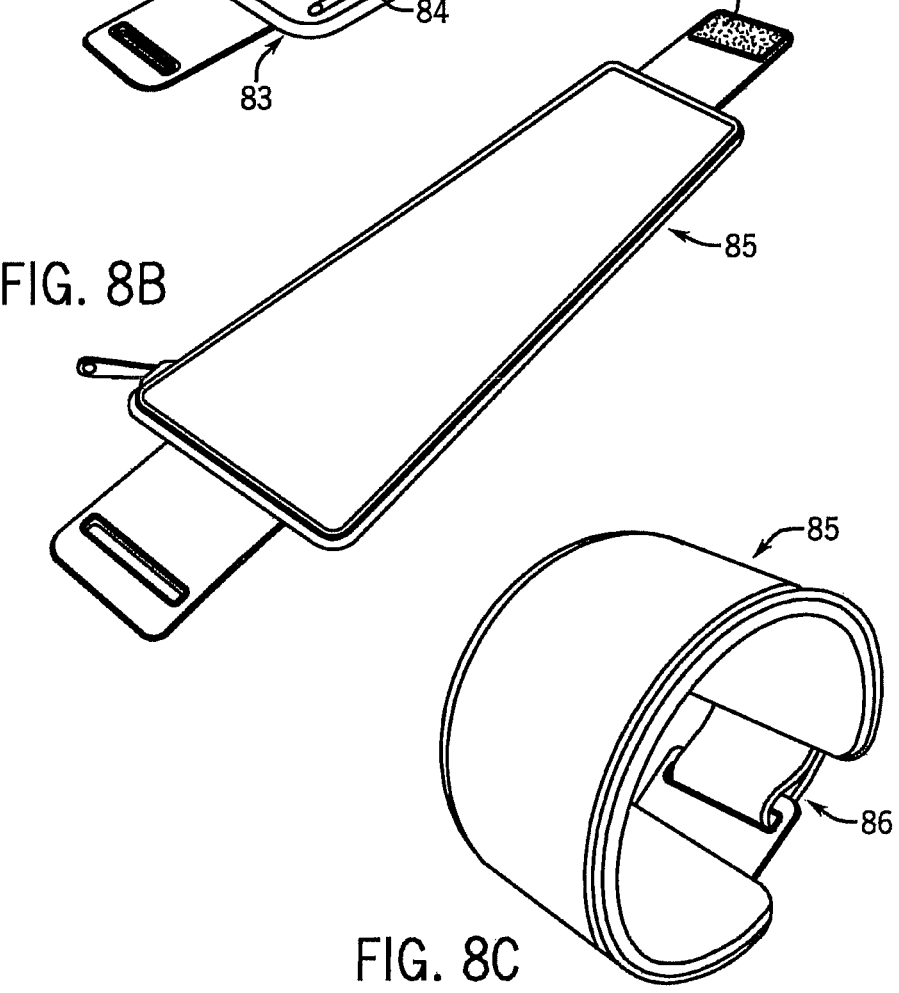
FIG. 8B is a view similar to FIG. 2C, but of the eighth embodiment.
Figure 8C:
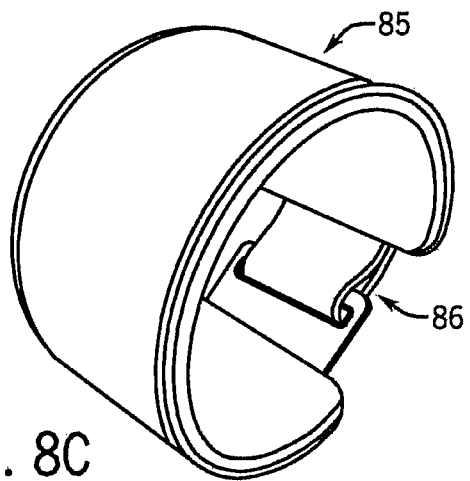
FIG. 8C is a view similar to FIG. 2D, but of the eighth embodiment.

In the embodiment of FIGS. 8A-8C a band 85 has a silicone shroud having an upper cover 81 and lower support 83 hingeably connected and closable via a zipper 89. Perforations 87 allow for air to activate the heating pouch 82. Note also interior raised ribs 84. To prepare for use, the heating pouch 82 and the substrate 80 impregnated with repellant are placed into the open band, which is then closed and zipped. In this embodiment, the band is strapped onto the wrist or ankle via a more belt buckle-like strap 86.

Figure 9A:
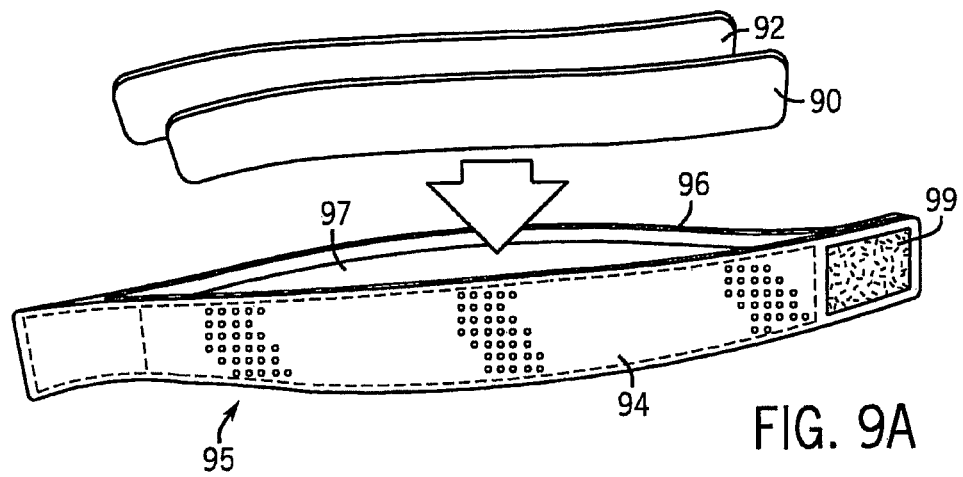
FIG. 9A is a view analogous to FIG. 8A, but of a ninth embodiment.
Figure 9B:
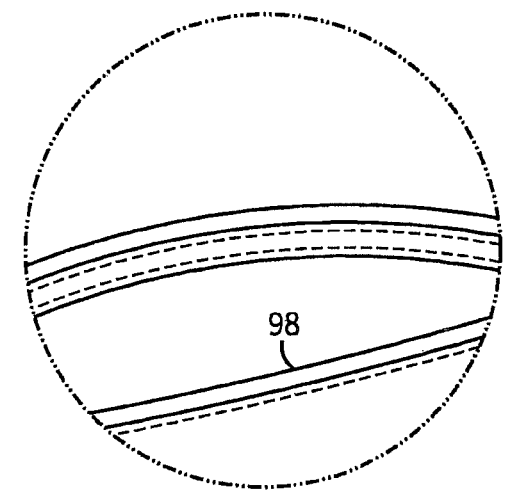
FIG. 9B is a view showing in detail how the cavity of the FIG. 9A embodiment is formed.
Figure 9C:
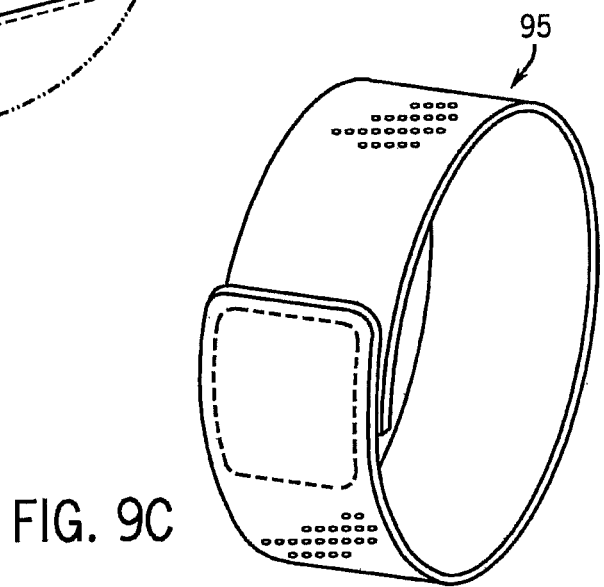
FIG. 9C is a view similar to FIG. 8C, but of the ninth embodiment.

In the embodiment of FIGS. 9A-9C, the band 95 is in the form of a canvas pouch having an upper cover 96, a lower support 94, and a central cavity pocket 97. A side of the lower support 98 adjacent the pocket 97 may be coated to help prevent repellant from passing through the canvas pouch and contacting the skin. To prepare for use, the substrate 90 impregnated with repellant and heating pouch 92 are placed inside the pocket 97. In this embodiment, the band is strapped onto a wrist or ankle via a recloseable closure 99.

In the embodiment of FIGS. 10A and B band 108 has a single molded piece that is foldable along a living hinge 109 to define an upper cover 106 and a lower support 107. Perforations 103 allow for the release of volatilized repellant. The repellant is impregnated onto a substrate 100, which is then placed adjacent the perforations 103. A heating pouch 102 is placed on the lower support 107, and the molded piece is folded along the living hinge to trap the substrate 100 and heating pouch 102. In this embodiment, the band is strapped onto the wrist or ankle via a peg 105/hole 109 connection.

Figure 11A:
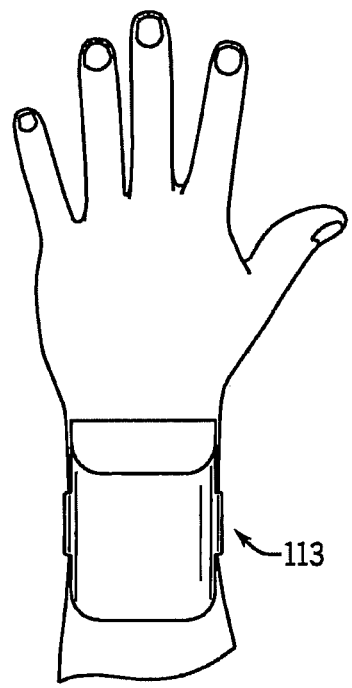
FIG. 11A is a view similar to FIG. 4B, but of an eleventh embodiment.
Figure 11B:
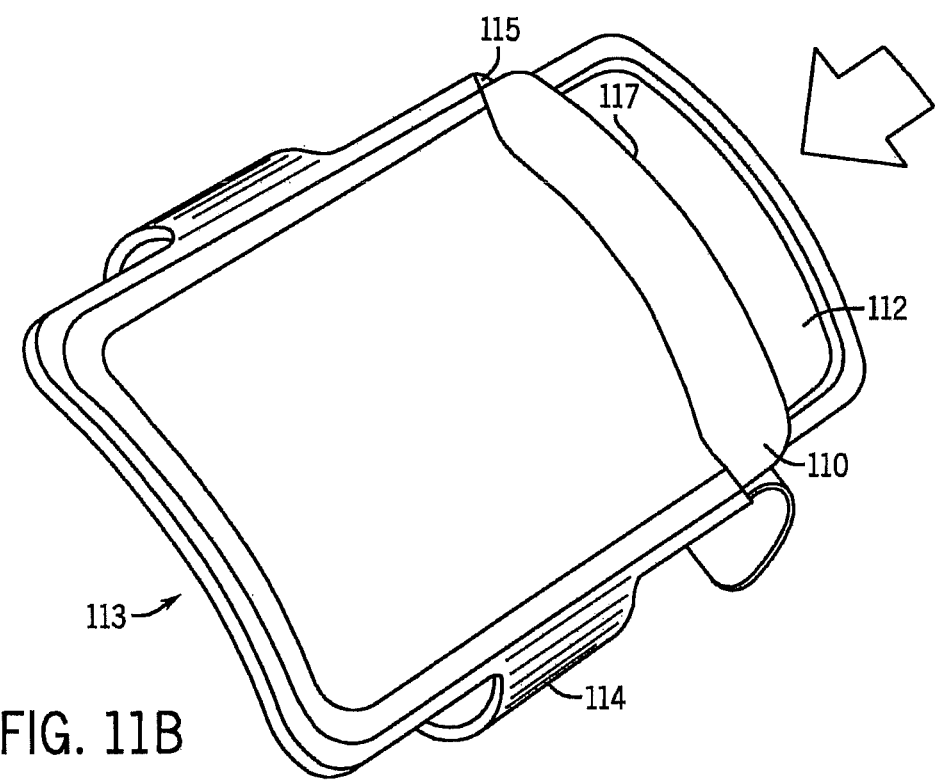
FIG. 11B is a perspective view showing the FIG. 11A band mounted on a wrist.

In the embodiment of FIGS. 11A-B a band 113 has a first 115 and second 117 pocket attached to a strap 114. In use, a substrate 110 impregnated with a repellant is placed in pocket 115 and the heating pouch 112 is placed into the pocket 117.

Figure 12B:
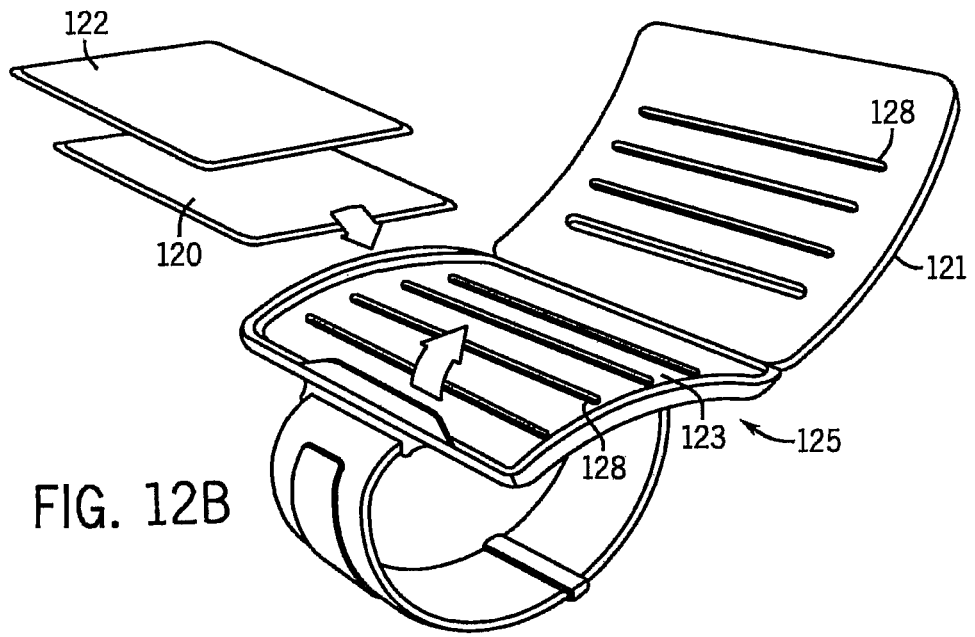
FIG. 12B is a view similar to FIG. 4A, but of the twelfth embodiment.
Figure 12A:
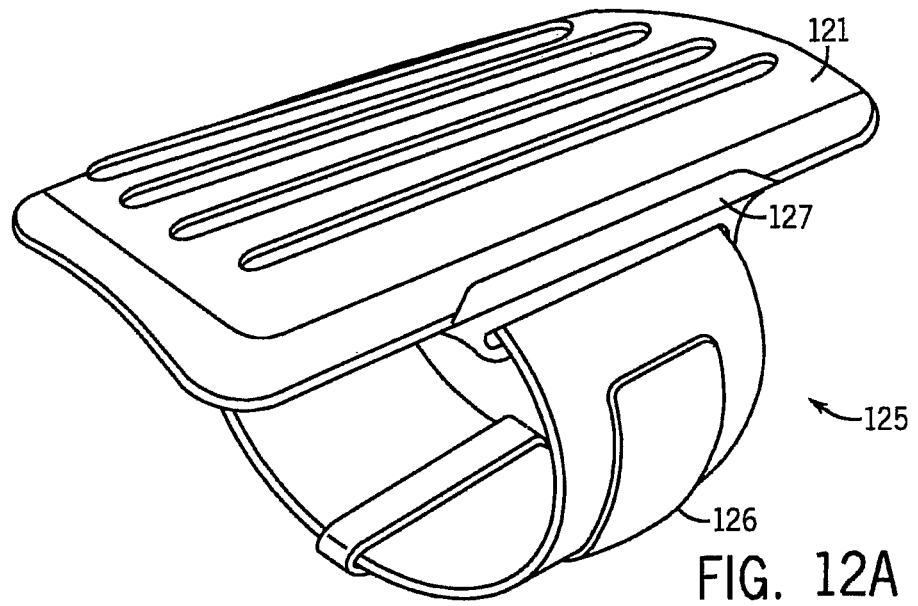
FIG. 12A is a view similar to FIG. 4B, but of a twelfth embodiment.

In the embodiments of FIGS. 12A and B band 125 has an upper cover 121 and a lower support 123, both made of silicone and conforming to the profile of a typical user's wrist. There is also incorporation of an internal sealing gasket with a locking feature 127. There are also air slots 128 for air circulation. To prepare for use, a substrate 122 impregnated with repellant and a heating pouch 120 are placed into the silicone case, and the case is locked shut using the locking feature 127. In this embodiment, the band is strapped onto the wrist or ankle via a standard adjustable strap 126.

In the embodiment of FIGS. 13A-C, band 135 has an upper cover 131 and a lower support 133 both made of fabric, hingeably connected, and closable via a Velcro edge 137. The band further has top perforations 138 for venting. To prepare for use, two substrates 130 impregnated with repellant sandwich pouch 132, and are placed in the band. The upper cover and lower support are then folded together. There is also a strap closure 136.

In the embodiments of FIGS. 14-16 we are exemplifying that the heating pouch 142 can be at various distances from the lower support 147, that a substrate 140 impregnated with repellant may be placed on one side of the pouch 142, or two may be placed on two sides of the pouch, and that air ventilation 148 may occur on one side or both sides.

Figure 17:
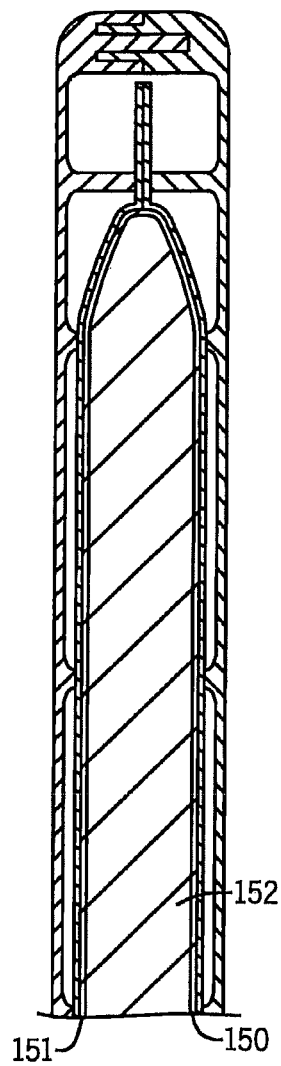
FIG. 17 is a partial cross sectional view of a seventeenth embodiment.
Figure 18:
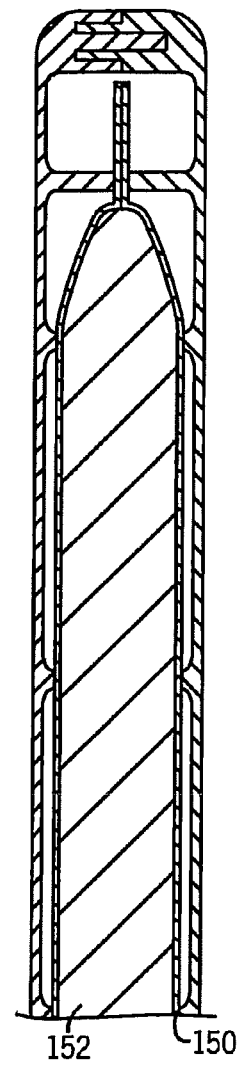
FIG. 18 is a view similar to FIG. 17, but of an eighteenth embodiment.

In the embodiments of FIGS. 17 and 18 we show that a pouch 152 may act on a substrate 150 which is part of the pouch itself (FIG. 17), or a separate sleeve 151 around the pouch (FIG. 18).

Figure 19A:
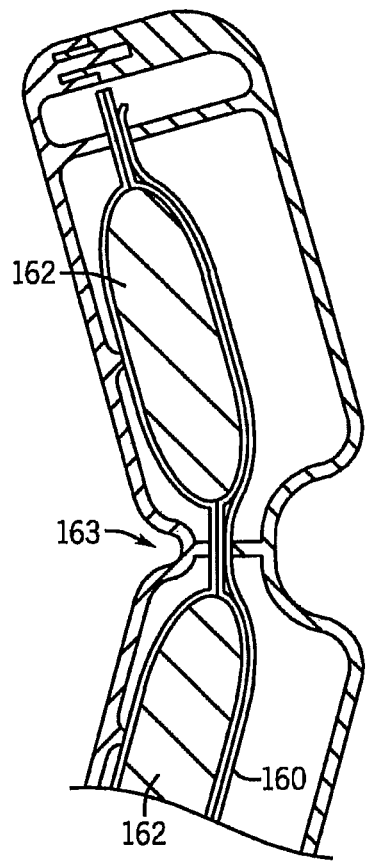
FIGS. 19A and 19B show partial cross sectional views through a nineteenth embodiment, with the FIG. 19A embodiment showing the structure flexed to accommodate wrist mounting.
Figure 19B:
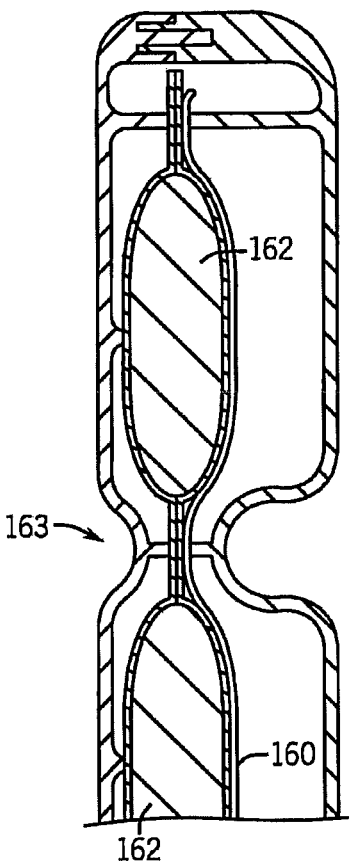

In the embodiment of FIG. 19, multiple heating pouches 162 may be heating a single substrate 160, with the assist of a flexible bend 163.

While preferred embodiments of the present invention have been described, other embodiments of the invention are within the spirit and scope of this disclosure. For example, instead of chemical based heaters one could use battery powered heaters, or sleeves for receiving heat packs that are preheated elsewhere. However, exothermic chemical pouches are highly preferred.

Also, other means of protecting the wrist or ankle from heat exposure are contemplated. For example, one could include a sheet of insulation inward of the heater. Thus, the claims should be looked to in order to judge the full scope of the invention.

INDUSTRIAL APPLICABILITY

The present invention provides insect controlling bands that, while not requiring the user's skin or clothing to directly contact any chemical repellant, provides for effective delivery of repellants and other control agents through heat volatilization.

What is claimed is:

1. A wearable device, comprising:
a band structure;
a substrate that has a volatile insect control chemical mountable on the band structure; and
a heater positioned to be suitable to, when initiated, heat the substrate to expedite dispensing of the volatile insect control chemical, wherein the device does not have a fan;
wherein the band structure has an upper cover and a lower support such that when the upper cover lies on top of the lower support they form a housing with a cavity there between;
wherein the device is configured with ribs underneath the lower support that are configured to insulate where the device is worn from being exposed to heat generated by the heater while also being configured to allow air flow from inwardly of the band up to the heater.

2. The device of claim 1 wherein the heater is in a form of a holder that retains a heating structure.

3. The device of claim 2, wherein the holder is in a form of a pouch, and the heating structure comprises chemicals positioned in the pouch that if initiated will chemically generate heat.

4. The device of claim 3, wherein the chemicals can be caused to generate heat by exposure to air.

5. The device of claim 4, wherein the chemicals comprise iron powder.

6. The device of claim 1, wherein the substrate and heater are positioned in the cavity between the upper cover and lower support.

7. The device of claim 1, wherein the cavity can be opened when it is desired to remove the substrate and/or heater, and/or replace one or both.

8. The device of claim 1, wherein the volatile insect control chemical comprises a repallant selected from the group consisting of transfluthrin and metafluthrin.

9. The device of claim 1, wherein the volatile insect control chemical is a mosquito repellant.

10. The device of claim 1, wherein the band structure is configured such that in use the volatile insect control chemical is dispensed both radially up out and also sideways.

11. The device of claim 1, wherein there are two such substrates that sandwich the heater.

12. A wearable insect controlling device, the device comprising:
a band structure;
a substrate that has a volatile insect control chemical mountable on the band structure; and
a heater positioned to be suitable to, when initiated, heat the substrate to expedite dispensing of the volatile insect control chemical;
wherein the heater is of a type that can be initiated by exposing chemicals in the heater to air; and
wherein the band structure has an upper cover and a lower support such that when the upper cover lies on top of the lower support they form a housing with a cavity there between; and
wherein the device is configured with ribs underneath the lower support that are configured to insulate where the device is worn from being exposed to heat generated by the heater;
wherein the device is configured without a fan.

13. The device of claim 12, wherein the device is wearable on a human wrist or human ankle.

* * * * *